Figure 1:
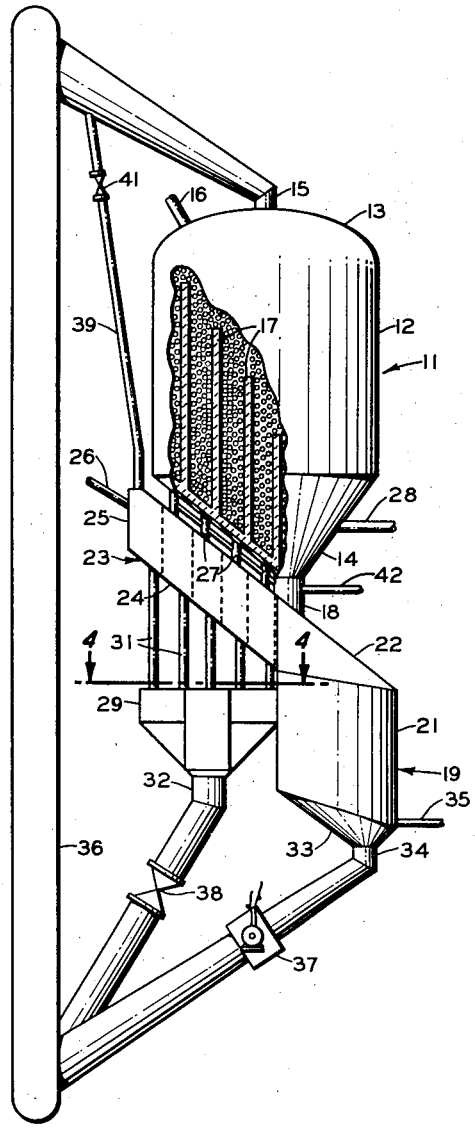

Oct. 23, 1951     D. J. QUIGG ET AL     2,572,758
METHOD AND APPARATUS FOR CONVERTING AND QUENCHING HYDROCARBONS
Filed Oct. 24, 1949     2 SHEETS—SHEET 1

INVENTORS.
D.J. QUIGG
C.E. ALLEMAN
BY *Hudson and Young*
ATTORNEYS

Oct. 23, 1951 D. J. QUIGG ET AL 2,572,758
METHOD AND APPARATUS FOR CONVERTING AND QUENCHING HYDROCARBONS
Filed Oct. 24, 1949 2 SHEETS—SHEET 2

INVENTORS.
D. J. QUIGG
C. E. ALLEMAN
BY Hudson and Young
ATTORNEYS

Patented Oct. 23, 1951

2,572,758

UNITED STATES PATENT OFFICE 2,572,758

METHOD AND APPARATUS FOR CONVERTING AND QUENCHING HYDROCARBONS

Donald J. Quigg, Bartlesville, Okla., and Carl E. Alleman, Cactus, Tex., assignors to Phillips Petroleum Company, a corporation of Delaware Application October 24, 1949, Serial No. 123,266

12 Claims. (Cl. 23—1)

1

This invention relates to pebble heat exchangers. In one of its more specific aspects it relates to a fluent solid material quench for reaction products in pebble heater apparatus. In another of its more specific aspects it relates to a method for preventing carbon lay-down in reaction chambers of pebble heater apparatus. In another of its more specific aspects it relates to improved pebble heat exchange apparatus.

Thermal conversion processes which are carried out in so-called pebble heater apparatus utilize a fluent mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact the gaseous reactant materials in a second direct heat exchange relation, furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are passed upwardly through the cylindrical bed, sometimes being introduced thereinto at the periphery of the bed and at its lower end, and are sometimes introduced through a refractory arch which supports the moving pebble bed. At other times, heat is supplied to the heating chamber by supplying a fuel to the lower portion of the pebble bed within the heater chamber and burning the fuel on the surface of the pebbles so as to heat the pebbles by combustion. Further heating of the pebbles is accomplished by passing the resulting combustion gas upwardly through the downflowing fluent mass of pebbles.

The heated pebbles are introduced into the upper portion of a reaction chamber. Reactant materials are introduced into the lower portion of the reaction chamber and are caused to flow

2 upwardly through the downflowing fluent hot pebble mass therein, thereby obtaining the heat required for thermal conversion of the reactant materials. Reaction products are removed from the upper portion of the reaction chamber generally at points above the top surface of the pebble bed. One disadvantage of the use of pebble heater apparatus for the conversion of hydrocarbon materials is the fact that the reaction products tend to accumulate in the space above the pebble bed, adjacent the surface of the reaction chamber and decompose so as to lay down carbon on the reaction chamber surface. The accumulation of carbon on the reaction chamber surface finally reaches such proportions as to seriously interfere with the removal of reaction products through the effluent outlet of the reaction chamber. Additional trouble is encountered when large fragments of the accumulated carbon separate from the surface of the reaction chamber, pass downwardly through the chamber with the fluent mass of pebbles and become lodged in the pebble outlet of the chamber, thus reducing or preventing the flow of pebbles through the pebble heater apparatus.

Pebbles of different temperatures which are introduced into a reaction chamber at different points in the top of the chamber to form a contiguous pebble bed therein do not move laterally or intermix materially of their own accord. Two different temperature areas are thus formed in vertical sections of the chamber. Gaseous materials tend to spread through the contiguous bed and thus encounter dissimilar heat exchange. Little success is encountered, therefore, when attempting to quench with cool pebbles introduced into a reaction chamber.

Broadly speaking, this invention comprises a means and method of reacting hydrocarbons, by which method the accumulation of carbon in the upper portion of the reaction chamber is substantially prevented. A plurality of pebble portions which have been heated to different temperatures within a pebble heating chamber are used as quenching media of successively lower temperatures. The pebble portions of various temperatures are passed through a quench chamber so as to form contiguous pebble beds therein which have vertical interfaces therebetween and which are disposed with relation to the reaction chamber so that the hottest pebble bed of the quench chamber is contiguous with the hot pebbles of the reaction chamber and forms a vertical interface therebetween and the successive pebble beds laterally disposed from the reaction chamber are at successively lower temperatures. Reaction products are removed from the reaction chamber and are immediately passed through the quenching media of successively lower temperature.

Solid heat exchange material which is conventionally used in pebble heater apparatus is generally called "pebbles." The term pebbles as used herein denotes any solid refractory material of flowable size and form, having strength which is suitable to carry large amounts of heat from the pebble heating chamber to the reaction chamber without rapid deterioration or substantial breaking. Pebbles conventionally used in pebble heater apparatus are substantially spherical in shape and range from about ⅛ inch to about 1 inch in diameter. In a high temperature process, pebbles having a diameter of between about ⅛ inch and ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, stellite, zirconia, and mullite may be satisfactorily used to form such pebbles or may be used in admixture with each other or with other materials. Pebbles formed of such materials, when properly fired, serve very well in high temperatures. Some pebbles, such as mullite-alumina pebbles, withstand temperatures up to about 3500° F. Pebbles which are used may be either inert or catalytic, as used in any selected process.

An object of this invention is to provide an improved method for operation of pebble heater apparatus. Another object of the invention is to provide improved means for quenching reaction products in pebble heater apparatus. Another object of the invention is to provide means for preventing the formation of coke adjacent reaction product outlets of reaction chambers of pebble heater apparatus. Another object of the invention is to provide an improved method for removing tarry material from reaction products. Another object of the invention is to provide an improved pebble heater apparatus. Other and further objects and advantages will be apparent to those skilled in the art upon study of the accompanying discussion and the drawings.

Figure 2:
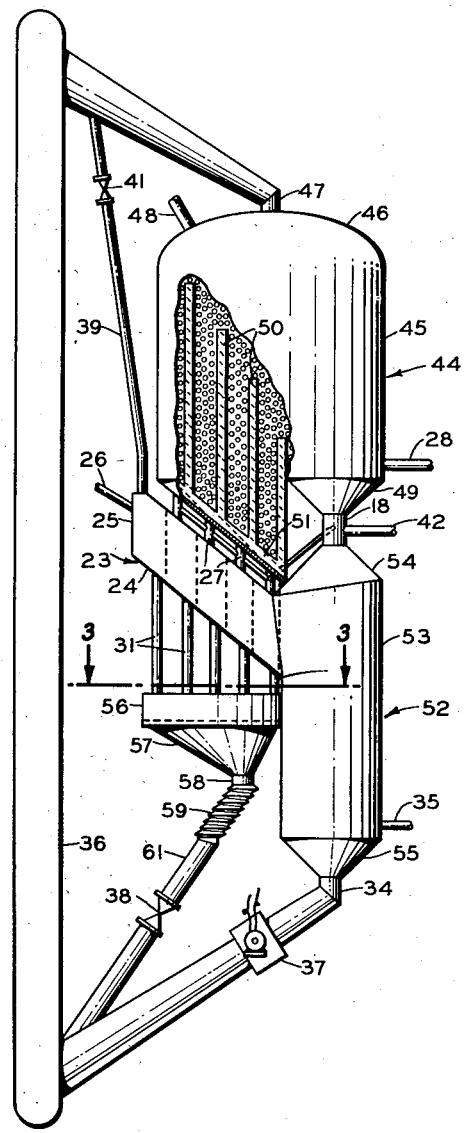
Figure 3:
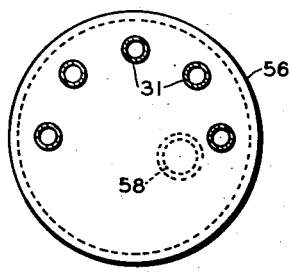
Figure 4:
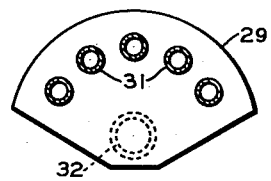
Figure 5:
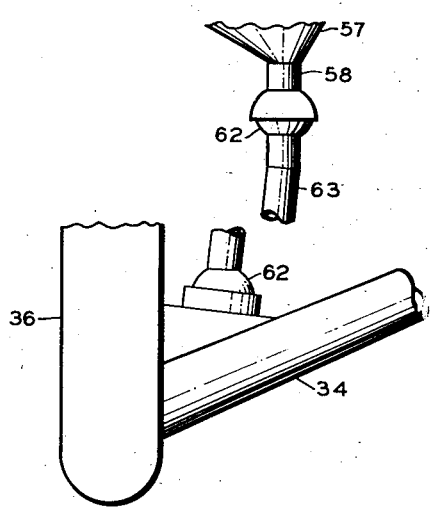
Figure 6:
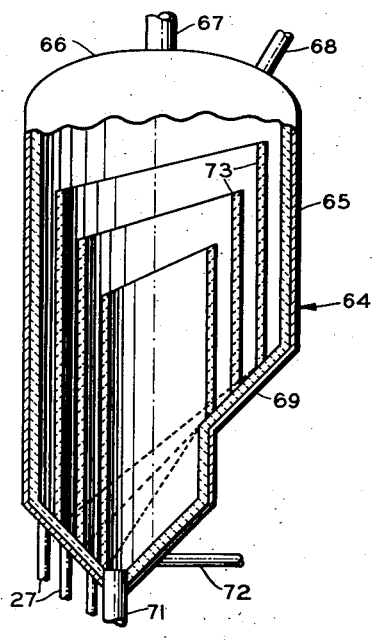

Understanding of this invention will be facilitated upon reference to the diagrammatic drawings in which Figure 1 is a schematic elevation, partly in section, of a pebble heater apparatus of this invention. Figure 2 is a schematic elevation, partly in section, of a preferred modification of the pebble heater apparatus of this invention. Figure 3 is a plan view of the pebble collector taken on line 3—3 of Figure 2. Figure 4 is a plan view of a modified pebble collector taken on line 4—4 of Figure 1. Figure 5 is a sectional view of a conduit portion of the pebble heater apparatus of this invention showing a modified flexible connection for one of the pebble conduits. Figure 6 is an elevation in section of a modified pebble heater chamber of this invention.

Referring particularly to the device shown in Figure 1 of the drawings, pebble heater chamber 11 comprises shell 12 which is closed at its upper and lower ends by closure members 13 and 14. Pebble inlet conduit 15 and effluent outlet conduit 16 are provided in closure member 13. Wall members 17 extend from the bottom of shell 12 upwardly into a chamber formed within shell 12. Heating material inlet conduit 28 opens into the lower portion of chamber 11 and preferably into that portion within bottom closure member 14. The wall members disposed farther from heating material inlet conduit 28 preferably extend to points at successively greater heights than does the wall member nearest conduit 28. Pebble outlet conduit 18 is provided in the lowest portion of bottom closure member 14 so that it opens downward from the same chamber portion in shell 12 which is connected with conduit 28. Wall members 17 preferably extend from wall to wall of shell 12 as parallel cords or tangents of circles and on the same side of conduit 18 in closure member 14. Alternately, wall members 17 may be in the shape of upright conduits of circular or regular-sided cross-section. Wall members 17 form open top chamber portions within the chamber formed within shell 12, the inlet to each successive chamber portion formed between the wall members being at progressively higher points within shell 12 as the chamber portion is disposed farther from outlet conduit 18. The inlets to these chamber portions, however, must not be too high to be readily accessible to a contiguous bed of pebbles within shell 12 and extending at the natural angle of repose from pebble inlet conduit 15. It is preferable, though not essential, that the horizontal cross-sectional areas of these chamber portions be nearly equal. The wall member 17 which is nearest outlet conduit 18 preferably extends above the level of the inlet to conduit 18 a distance equivalent to between ¼ and ¾ the height of the pebble bed above conduit 18 and the open top chamber portion preferably has a cross-sectional area of between ⅓ and ⅔ the total cross-sectional area of chamber 11.

Reactor chamber 19 is disposed below chamber 11 and comprises shell 21. Shell 21 is closed at its upper end by closure member 22, which closure member slopes at an angle greater than the angle of repose of the pebbles which are introduced into that chamber. Pebbles which are supplied to the chamber tend to assume the angle of repose which may be defined as the angle, taken from the horizontal, which the top of a pebble mass will assume when poured from a central outlet. The angle of repose generally varies between 30° and 45° from the horizontal depending upon the size, shape, and surface condition of the pebbles. Quench chamber 23, which comprises shell 24, extends laterally from the upper end of shell 21, preferably upwardly at an angle so that its upper surface is a continuation of the slope of closure member 22. Shell 24 is closed at its upper end by closure member 25. Effluent outlet conduit 26 is provided in closure member 25 of shell 24, which closure member is opposite shell 21. Conduit 18 is connected to closure member 22 at a point adjacent the juncture of shell 24 and a vertical projection of shell 21. Pebble conduits 27 extend between the bottoms of the open top chamber portions formed between wall members 17 and the top side of quench chamber 23.

Pebble collector 29 is disposed below quench chamber 23 and is connected to quench chamber 23 by means of a plurality of pebble conduits 31 which extend from points disposed along the bottom of quench chamber 23 to the upper surface of collector member 29. The structure of collector member 29 is more fully disclosed in Figure 4 of the drawings. Pebble conduits 31 extend into the top of collector member 29 and their lower ends are disposed along an arc, the axis of which coincides with that of pebble outlet conduit 32 in the bottom of collector member 29. Conduits 31 are preferably disposed along the arc at equal intervals. The ends of conduits 31 must be located far enough above pebble outlet conduit 32 to permit natural pebble flow from conduits 31 to conduit 32.

Shell 21 is closed at its bottom end by closure member 33 and pebble outlet conduit 34 is provided in closure member 33 at a point adjacent the vertical projection of shell 21 but is disposed on the side of chamber 19 opposite the side adjacent pebble conduit 18. Reactant material inlet conduit 35 is provided in the lower portion of shell 21 preferably in the side of that chamber or in the side of closure member 33 adjacent pebble outlet conduit 34. Pebble outlet conduit 34 is connected at its lower end to the lower end portion of elevator 36. Pebble feeder 37, which may be a rotatable pebble feeder, a vibratory feeder, or the like, is provided intermediate the ends of conduit 34. Conduit 32 extends from the bottom of collector chamber 29 to the lower end portion of elevator 36 and is provided with pebble flow control means 38 which may be a conventional star valve, a gate valve, or some other similar type flow control means. Elevator 36 is connected at its upper end portion with the upper end of pebble inlet conduit 15. Pebble conduit 39 extends between a point intermediate the ends of pebble inlet conduit 15 or between the upper end portion of elevator 36 and the upper end of shell 24. Alternately, the buckets of elevator 36 may be divided so as to make separate connection between conduit 32 or conduit 34 and conduit 39. Flow control means 41 which may be a conventional star valve, a gate valve, or the like, is provided intermediate the ends of pebble conduit 39. Conduit 42 extends to conduit 18 and conduits 27 from an inert gas supply member.

In the operation of the device shown as Figure 1 of the drawings, pebbles are introduced into the upper end of chamber 11 through pebble inlet conduit 15 which is preferably centrally disposed therein. The pebbles form a flowing contiguous bed within chamber 11 and flow downwardly through that chamber. Heating material, such as hot combustion gases, or a fuel is introduced into the lower portion of chamber 11 through heating material inlet conduit 28. If a fuel is utilized, the fuel is burned on the surface of the pebbles contained in that portion of the chamber which opens directly into conduit 18. The hot combustion gases, either from an external source or, when a fuel is introduced, those resulting from the combustion of the fuel on the surface of the pebbles pass upwardly through the pebble bed and are removed from the upper portion of chamber 11 through effluent outlet conduit 16. A portion of the pebble mass within chamber 11 passes into the open upper end of each of the chamber portions bordered by wall members 17. The chamber portion which is closest to pebble outlet conduit 18 preferably has its inlet disposed at the least height within the chamber 11. The pebbles which pass into that chamber portion therefore contact the hottest heat exchange material in chamber 11 and are therefore at a relatively high temperature. Pebbles which pass into open ends of the chamber portions which are successively disposed farther from the heating material inlet conduit 28 are at successively lower temperatures for the reason that their contact time with the heat exchange materials is considerably less because the pebbles are protected from the flow of the heating materials by the innermost wall member forming the successive chamber portions and for the further reason that the heat exchange material tends to have its temperature reduced as it progresses farther from its inlet point.

The heated pebbles are passed through pebble conduit 18 into chamber 19 and form a flowing, contiguous pebble mass therein. Closure member 22 is preferably sloping so that no free space is encountered between the top of the pebble bed within chamber 19 and closure member 22. Pebbles from the open top chamber portions within chamber 11 pass by means of pebble conduits 27 into quench chamber 23 and form contiguous pebble beds which have vertical interfaces therebetween. The pebble mass from the open top chamber portion nearest to but not opening into conduit 18 has a vertical interface with the pebbles which are provided to chamber 19 through pebble conduit 18. Reactant materials are introduced into the lower portion of chamber 19 through conduit 35 and flow upwardly through that chamber countercurrent to the flow of hot pebbles therein. The hot pebbles provide the necessary heat for reaction of the reactant materials. Resulting reaction products flow upwardly and laterally from chamber 19 into chamber 23 and flow transversely through the plurality of contiguous pebble beds of successively lower temperatures. The quenched products are removed from the upper end portion of chamber 23 through effluent outlet conduit 26.

Pebbles which have been cooled in the reaction within chamber 19 are removed therefrom through pebble outlet conduit 34 and are fed by means of pebble feeder 37 to elevator 36 which elevates the cooled pebbles to pebble inlet conduit 15. A portion of the cool pebbles are withdrawn from pebble inlet conduit 15 through pebble conduit 39 and flow control means 41 and are introduced therethrough into the upper end portion of chamber 23 so as to form a cool contiguous pebble bed which is contiguous with and cooler than the plurality of contiguous pebble beds formed by pebbles from the open top chamber portions within chamber 11. The lowest temperature pebbles of this system may be employed in the upper end of quench chamber 23 by using divided buckets in the elevator 36 and supplying direct to conduit 39 only pebbles emerging from the bottom of chamber 19. The remaining portion of pebbles is introduced into the upper end portion of chamber 11.

Pebbles from quench chamber 23, which are heated in the quenching process, are withdrawn from that chamber through pebble conduits 31 and are passed into pebble collector 29 from which they are removed by means of pebble conduit 32 through flow control means 38. Those pebbles also are elevated by means of elevator 36 to conduit 15. Inasmuch as conduits 31 are disposed equi-distant from pebble outlet conduit 32, the flow of pebbles from each of the open top chamber portions within chamber 11 is substantially uniform, depending upon the comparative size of conduits 31. Any tarry materials which are laid down on the surface of the pebbles within the quench chamber are burned off when those pebbles are passed through pebble heater chamber 11. The inert gas, such as steam, which is introduced to pebble conduits 18 and 27 through conduit 42 provides a choke means which prevents the flow of reaction products upwardly into pebble heater chamber 11.

Referring particularly to the device shown in Figure 2 of the drawings, chamber 44 comprises shell 45 which is closed at its upper end by closure member 46. Pebble inlet conduit 47 and effluent outlet conduit 48 are provided in closure member 46. Closure member 49, which is preferably in the form of a hopper, forms a portion of the bottom closure of shell 45. Wall members 50 extend upwardly from closure member 51 which forms a second closure member in the bottom of shell 45. Wall members 50 are similarly disposed to wall members 17 heretofore described in connection with Figure 1 of the drawings. Reaction chamber 52 comprises shell 53 which is closed at its upper and lower ends by closure members 54 and 55. Quench chamber 23 extends from the side wall of shell 53 and communicates with the chamber within shell 53 through an opening in a common wall therebetween. Quench chamber 23 comprises shell 24 which is closed at its end away from chamber 52 by closure member 25 as heretofore described. Effluent outlet conduit 26 is provided in the upper end portion of chamber 23. Pebble conduits 27 extend between the open top chamber portions, formed within chamber 44 by wall members 50, to the top side of quench chamber 23. Pebble conduits 31 extend between points disposed along the length of the bottom side of quench chamber 23 and the upper portion of pebble collector 56. Bottom closure 57 of pebble collector 56 is rotatably affixed therein. Pebble conduits 31 extend into the top of pebble collector 56 and terminate along an arc having an axis which coincides with the rotational axis of rotatably affixed bottom closure member 57. Pebble outlet conduit 58 in bottom closure 57 is offset from the rotational axis of the bottom closure member. This structure for controlling flow of pebbles through selected conduits is more fully disclosed and claimed in continuation-in-part U. S. application Serial No. 157,665, filed April 24, 1950, by one of us. The ends of conduits 31 must be positioned far enough above pebble outlet conduit 58 to permit natural pebble flow from all the conduits 31 into conduit 58 for at least one rotational position of bottom closure 57. To assure natural pebble flow the ends of conduits 31 terminate on an arc which is positioned at least ⅝ of the arc radius, in a vertical distance above the pebble outlet from the pebble collector. Flexible displacement member 59, which may be a flexible bellows, extends between pebble outlet conduit 58 and pebble conduit 61. Pebble conduit 61 extends between flexible displacement member 59 and the lower end portion of elevator 36. Flow control means 38 is provided in pebble conduit 61. Heating material inlet conduit 28 is provided in the lower portion of shell 45 and in that portion of the chamber which is closed by bottom closure member 49. Reactant material inlet conduit 35 is provided in the lower portion of reactor chamber 52. Pebble outlet conduit 34 extends betwen bottom closure member 55 of chamber 52 and the lower end portion of elevator 36. Pebble feeder 37 is provided intermediate the ends of pebble outlet conduit 34. Elevator 36 is connected at its upper end to pebble inlet conduit 47. Pebble conduit 39 extends between a point intermediate the ends of pebble inlet conduit 47 and the upper end portion of quench chamber 23.

The operation of the device shown as Figure 2 of the drawings is similar to that described in connection with the device shown in Figure 1 of the drawings. The operation differs in particular with respect to pebble collector 56. By rotating bottom closure member 57 in pebble collector 56 to a desired point, as shown in Figure 3 of the drawings, pebble outlet conduit 58 is disposed closer to a portion of pebble conduits 31 on their arc than to the remaining portion of pebble conduits 31. Flow of pebbles from conduits 31 which are closer to conduit 58 than the other conduits 31 is facilitated thereby while the flow from conduits 31 which are farther away is retarded. In this manner, the flow of pebbles of any desirable temperature may be selectively increased while the flow of pebbles of a different tmperature may be decreased. Flexible displacement member 59 allows bottom closure 57 to be rotated through at least a portion of a revolution without moving pebble conduit 61.

The device shown in Figure 5 of the drawings is a modification of the conduit which extends between pebble outlet conduit 58 of pebble collector 56 and the lower portion of elevator 36. Ball and socket joints 62 or other swivel-type joints are provided at each end of pebble conduit 63 and provide the flexibility required for rotating bottom closure member 57 in pebble collector 56.

In the device shown as Figure 6 of the drawings, chamber 64, comprises shell 65 which is closed at its upper end by closure member 66. Pebble inlet conduit 67 and effluent outlet conduit 68 are provided in closure member 66. The bottom of shell 65 is closed by closure by closure member 69. Pebble outlet conduit 71 is provided in the bottom of closure member 69 and heating material inlet conduit 72 is provided in closure member 69 adjacent pebble outlet conduit 71. Pebble outlet conduit 71 extends from a chamber portion which is surrounded by the plurality of concentric wall members 73. The wall members which are closest to the sidewall of shell 65 preferably extend upwardly to a greater height within the chamber formed within shell 65 than the wall members which form the inner concentric chambers. The wall members 73 form open top chamber portions which have bottom surfaces sloping toward pebble outlet conduits 27 in their lower portions.

The operation of the modification shown as Figure 6 of the drawings is similar to that of the pebble heating chambers 11 and 44. Heating material is introduced into the chamber formed within the inner concentric wall member 73 and passes upwardly through chamber 64 countercurrent to the flow of pebbles through that chamber. After heating material clears the upper edge of each of the wall members, it spreads through the pebble bed to the next wall member and flows outwardly and upwardly through the remaining portion of the pebble bed. Varying periods of pebble-heating material contact time are thus provided. In that manner, pebbles of different temperatures are provided for the separate open top chamber portions within shell 64. The pebbles at the various temperatures are removed through pebble conduits 71 and 27 to reaction and quench chambers, respectively, and effluent material is removed through the upper portion of chamber 64 through effluent outlet conduit 68.

This invention is particularly adaptable to cracking light hydrocarbons, such as for the production of ethylene. The invention is also used for cracking residual hydrocarbon fractions to coke. If delayed coking is employed, this coke is laid down on the cool pebbles in the quench chamber and is subsequently removed in the heating chamber. This invention is also used for carrying out high velocity, high temperature reactions such as acetylene production which requires very short residence time and a very quick quench, thus requiring a minimum of residence time between reaching the maximum reaction temperature and being quenched below dissociating temperature.

The apparatus and the method of operation which has been disclosed above is very flexible and may be used in any number of operations. Various modifications and other advantages will be apparent to those skilled in the art upon study of the accompanying disclosure. The quench may be any convenient angle with the horizontal. If liquid products are to be condensed from the effluent the quench will extend somewhat downward from the reactor. It is preferred that at least two wall member be utilized although a single wall member may be utilized when stepwise quench is not desired. Any of the modifications described or shown may be substituted in either Figure 1 or Figure 2 for members shown. It is believed that such modifications are within the spirit and the scope of the disclosure.

We claim:

1. Improved pebble heater apparatus comprising in combination a first upright closed shell; a pebble inlet conduit and an effluent outlet conduit in the upper end of said first shell; a plurality of wall members extending from the bottom of said shell to successively different heights in the chamber formed within said shell so as to form separate open top chamber portions of successively different depths therebetween within said chamber; a second upright shell below said first shell; a third shell extending laterally from the upper portion of said second shell; a first pebble conduit extending from the bottom of the open top chamber portion which is bordered by the wall member of least height within said first shell, to the upper end portion of said second shell; second pebble conduits extending from the bottom portion of each additional said open top chamber portions bordered by said wall members downwardly to said third shell, said second pebble conduits being spaced apart along the length of said third shell so that a second conduit extending from the chamber portion contained between the wall members having the least height and next to the least height, is connected to said third shell at the end portion attached to said second shell and each successive second conduit along said third shell extending from the bottom of said open top chamber portions bordered by wall members of successively greater height; an effluent outlet in the end of said third shell and opposite said second shell; a pebble collector; a plurality of pebble conduits extending from points spaced along the bottom of said third shell to said pebble collector; a pebble outlet conduit in the bottom of said pebble collector; a heating material inlet conduit extending into the lower portion of the open top chamber portion in said first shell which is bordered by said wall member of least height; a reactant material inlet conduit in the lower portion of said second shell; a pebble outlet conduit in the bottom of said second shell; an elevator; a third pebble conduit extending between said pebble outlet conduit in said second shell and the lower portion of said elevator; a fourth pebble conduit extending between said pebble outlet conduit in said pebble collector and the lower portion of said elevator; and a fifth pebble conduit extending between the upper portion of said elevator and said pebble inlet conduit in said first shell.

2. The pebble heater apparatus of claim 1, wherein said wall members form open top shells of successively greater heights, from said wall nearest said first pebble conduit to said wall farthest from said first conduit.

3. The pebble heater apparatus of claim 2, wherein said open top shells formed by said wall members are laterally aligned with and are parallel to said first pebble conduit.

4. The pebble heater apparatus of claim 1, wherein said wall member nearest said first pebble conduit has a height above said first pebble conduit of between one-fourth and three-fourths the height of said pebble bed above said first pebble conduit; and said open top chamber portion which opens into said first pebble conduit has a cross-sectional area of between one-third and two-thirds the total cross-sectional area of said first chamber.

5. The pebble heater apparatus of claim 1, wherein said plurality of wall members is limited to two.

6. The pebble heater apparatus of claim 1, wherein a sixth pebble conduit extends from said fifth pebble conduit to the top of said third shell, at the end opposite said second shell; and a seventh pebble conduit extending between the bottom of said third shell, at the end opposite said second shell, and said pebble collector.

7. The pebble heater apparatus of claim 1, wherein said wall members form concentric shells of successively greater heights from the central portion toward the periphery of said first shell, said first pebble conduit and said heating material inlet conduit extending to said open top chamber enclosed by the innermost said wall member; and the bottom of each annular open top chamber formed by said concentric walls is sloped to the inlet points of said second conduits therein.

8. The pebble heater apparatus of claim 1, wherein said wall members are upright parallel plane members which extend from wall to wall of said first shell on the same side of said first pebble conduit; and said wall members are of successively greater height from the one nearest said first pebble conduit to the one farthest from said pebble conduit.

9. The pebble heater apparatus of claim 1, wherein a sixth pebble conduit extends from said fifth pebble conduit to the top of said third shell, at the end opposite said second shell; a seventh pebble conduit extends between the bottom of said third shell, at the end opposite said second shell, and said pebble collector; and said plurality of pebble conduits and said seventh pebble conduit extend from said third shell into said pebble collector and terminate therein on an arc located a vertical distance equal to at least five-eighths the radius of said arc above said pebble outlet in the bottom of said pebble collector and having an axis common with the axis of the pebble outlet in the bottom of said pebble collector.

10. The pebble heater apparatus of claim 1, wherein said first pebble conduit extends into said second shell at a point adjacent the upright projection of the wall of said second shell and adjacent said third shell; and said pebble outlet conduit in the bottom of said second shell is offset therein adjacent the wall of said second shell on the side opposite said first pebble conduit.

11. A method for reacting fluids in the presence of hot particulate solids and quenching resulting reaction products, which comprises in combination the steps of passing particulate solid material into a heating zone; passing a hot gas upwardly through said heating zone in direct heat exchange with said particulate solid material, whereby said particulate solid material is heated; removing gaseous effluent material from the upper portion of said heating zone; gravitating a portion of said heated particulate solid material from the bottom of said heating zone into a reaction zone; introducing reactant fluid into the lower portion of said reaction zone and reacting said materials in the presence of said heated solids; gravitating other portions of said solid heat exchange material from selected points throughout the vertical length of said heating zone and at different temperatures to a quenching zone; passing resulting reaction products from said reaction zone transversely and successively through said other solid heat exchange material portions of said particulate solid material from the material portion at the highest temperature through the material portion at the lowest temperature; removing quench products from said quenching zone; gravitating said solid material from said reaction zone; and gravitating said solid material from said quenching zone.

12. The method of claim 11, wherein a portion of the solid material withdrawn from said reaction zone and said quench zone is passed to said quench zone as the coolest particulate solid material therein; and the balance of said solid material from said reaction zone and said quench zone is passed to the upper portion of said heating zone.

DONALD J. QUIGG.
CARL E. ALLEMAN.

No references cited.